Nov. 8, 1966     F. KOPPELMANN     3,284,648
SWITCHING CIRCUIT
Original Filed Dec. 8, 1960

*Inventor:*
FLORIS KOPPELMANN
By: *Spencer & Kaye*
ATTORNEYS

United States Patent Office 3,284,648
Patented Nov. 8, 1966

3,284,648
SWITCHING CIRCUIT
Floris Koppelmann, Berlin-Siemensstadt, Germany, assignor to Licentia Patent - Verwaltungs - G.m.b.H., Frankfurt am Main, Germany
Original application Dec. 8, 1960, Ser. No. 74,561. Divided and this application Apr. 7, 1965, Ser. No. 446,367
8 Claims. (Cl. 307—136)

The present invention relates to switching circuits, and this application is a divisional application of my co-pending application Serial No. 74,561, filed December 8, 1960, now abandoned.

More particularly, the present invention relates to switching circuits for interrupting the flow of alternating current wherein the current is interrupted with little or no arcing.

It is the primary object of the present invention to provide a switching circuit which is capable of carrying out the above and, with this object in view, the present invention resides mainly in that improvement in a polyphase system having a plurality of $n$ lines none of which is a neutral line, which improvement comprises switching circuit means having parallely connected switching means and rectifier means, the switching circuit means being incorporated in only $(n-1)$ lines. The rectifiers are conductive in the same direction with respect to a load and have threshold voltages which are negligible in comparision with the operating voltage of the system.

Additional objects and advantages of the present invention will become apparent upon consideration of the following description when taken in conjunction with the accompanying drawings, in which FIGURES 1 to 4 show four different embodiments of the present invention.

In each of the embodiments, there is shown a polyphase system wherein there is a current mains having three lines 1, 2, 3, which are connected to a load which may, for example, be a reversible motor 110. This motor can be for use in elevators, cranes, hoists, or other systems in which frequent switching takes place.

Figure 1:
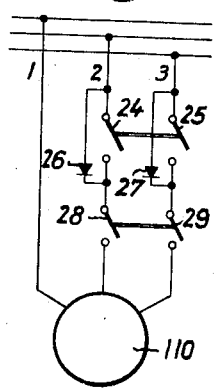

In the embodiment of FIGURE 1, the phase through line 1 is not interrupted but is connected directly between the mains and the load, whereas the lines 2 and 3 incorporate ganged switches 24, 25, which have rectifiers 26, 27 connected in parallel therewith, these rectifiers conducting in the same direction, that is to say, the rectifiers have the same polarity with respect to a load connected to the system in that they are all connected so as to pass current either from the current mains to the load, as shown in FIGURE 1, or from the load to the current mains. In practice, the rectifiers are preferably monocrystal semiconductors on a silicon or germanium base and have a threshold voltage that is negligible in comparison to the line voltage. The lines 2 and 3 further incorporate ganged switches 28, 29. When all four switches 24, 25, 28, 29, are open, no current whatever will flow between the current mains and the load. The rectifiers 26, 27, will reduce by half or more the total arc-overs occurring across the contacts of the four switches, even if they are opened at random, i.e., not in synchronism with the phase of the current. This is so because if the switches 24, 25 are opened when the rectifiers 26, 27 are conductive, no arc-overs will occur across the contacts of these switches, whereas no arc-overs will occur across the contacts of the switches 28, 29 when they are opened at an instant during which the rectifiers are non-conductive. Thus, by following the law of probability, it can be expected that each of the four switches will have an arc-over appearing across its contacts only during every other circuit breaking action. It can be taken for granted that these arc-overs will become extinguished when the current next passes through zero, because the deionization period will be of the order of one half cycle of the current. Thus, if the switches 24, 25 are synchronized so as to open when the rectifiers 26 and 27 are conductive, these switches will always open without arcing; similarly, if the switches 28, 29 are so synchronized as to open when the rectifiers 26 and 27 are blocked, then these switches will open without arcing. By appropriately controlling the closing of the switches, no arcing will occur during circuit making.

It will be appreciated that the ganged switches 24, 25, as well as the ganged switches 28, 29, can be so synchronized that all of the switches will open without arc-over. The opening of the switches 28, 29 should then be so timed as to follow the opening of the switches 24, 25, by a time interval of the order of half a cycle.

Figure 2:
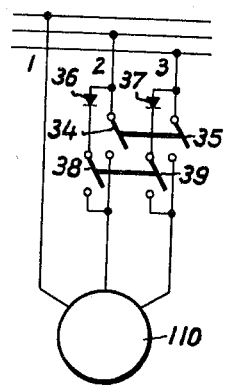

In the embodiment of FIGURE 2, the switches 38, 39, are not directly in series circuit with the switches 34, 35, but form with the rectifiers 36, 37 a series circuit which itself is in parallel with the switches 34, 35. This has the advantage that no current will normally flow through the switches 38, 39; instead, current will flow through these switches only during the switching process and then only for short periods.

Figure 3:
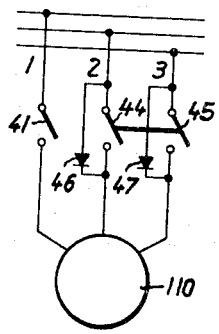

In the embodiment of FIGURE 3, switches 44 and 45 are incorporated in lines 2, 3, these switches having rectifiers 46, 47 connected in parallel therewith. In addition, a switch 41 is incorporated in the line 1, this switch, however, having no rectifier connected in parallel therewith. The circuit of FIGURE 3 operates in a manner similar to that of FIGURES 1 and 2, in that by proper synchronization of the switches, the circuit can be interrupted under currentless and voltageless conditions.

Figure 4:
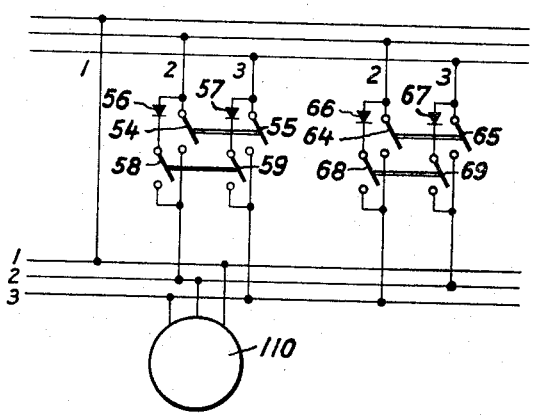

In the embodiment of FIGURE 4, the direction of rotation of the motor 110 can be reversed by using the switching circuit incorporating the components 54, 55, 56, 57, 58, 59, or the switching circuit incorporating the components 64, 65, 66, 67, 68, 69. It will be noted that if the direction of rotation of the motor 110 is to be reversed, it is not possible to use the basic circuit of FIGURE 3, inasmuch as there the phases in lines 2 and 3 are not completely interrupted but remain closed for current in one direction, so that if it were attempted to use the circuit of FIGURE 3 in a direction reversing switching system, balancing currents would flow through the lines 2 and 3.

The present invention, as depicted in FIGURES 1 through 4, is likewise applicable to alternating current systems having a number of phases other than three. Thus, in a two-phase or single phase system, the line 3 together with the switch 45 and rectifier 47 can be omitted. The switch 44 should then, in order to obtain arc-free opening, be actuated during the half wave in which the rectifier 46 is conductive, and the switch 41 should be opened about one half cycle later, when the rectifier 46 blocks the flow of current.

It has been found that the provision of the rectifiers in only $(n-1)$ out of $n$ lines reduces arc-over conditions to such an extent that arc-extinguishing chambers or other arc-extinguishing means can be substantially reduced in size, or even completely eliminated. When high voltages are involved, the single rectifiers shown in the various embodiments can be replaced by a plurality of serially connected rectifiers; if high currents are involved, a plurality of rectifiers can be connected in parallel with each other. Suitable series-parallel rectifier circuits are, of course, usable if both high voltages and high currents are to be handled. For such circuits the embodiments of FIGURES 1 and 4 are especially advantageous inasmuch as the cost of the rectifiers necessary to accomplish the desired results is reduced to two-thirds over circuits incorporating rectifier circuits in all lines.

It will thus be seen that, in accordance with the present invention, not all of the current phase or lines are provided with a rectifier-equipped switching means, instead, such rectifier-equipped switching means are provided in only $(n-1)$ out of $n$ lines.

It will be understood that the above description of the present invention is susceptible to various modifications, changes and adaptations, and the same are intended to be comprehended within the meaning and range of equivalents of the appended claims.

What is claimed is:

1. A polyphase system having a plurality of $n$ lines, $n$ being at least 3, none of which is a neutral line, there being rectifier-equipped switching means incorporated in only $(n-1)$ of said $n$ lines, respectively, each of said switching means including at least one switch and a circuit which is connected in parallel with such switch and which includes a semiconductor rectifier, the semiconductor rectifiers all being connected to have the same polarity with respect to a load connected to the system.

2. The combination defined in claim 1 wherein said semiconductor rectifiers have threshold voltages which are negligible in comparison with the operating voltage of the system.

3. The combination defined in claim 1 wherein the parallel circuit of each respective switching means is constituted in its entirety by said rectifier.

4. The combination defined in claim 1 wherein each switching means further includes a second switch which is connected in series with said one switch, and wherein the circuit which is connected in parallel with said one switch is constituted by said rectifier in its entirety.

5. The combination defined in claim 1 wherein the parallel circuit of each respective switching means comprises a series circuit incorporating the respective rectifier and a further switch.

6. The combination defined in claim 1, comprising a further switch incorporated in the line free of said rectifier-equipped switching means.

7. A polyphase system having a first set of three lines 1, 2, 3, and a second set of lines 1, 2, 3, there being only first, second, third and fourth rectifier-equipped switching means interconnected, respectively, between line 2 of said first set and line 2 of said second set, line 3 of said first set and line 3 of said second set, line 2 of said first set and line 3 of said second set, and line 3 of said first set and line 2 of said second set, each of said switching means including at least one switch and a circuit which is connected in parallel with such switch and which includes a semiconductor rectifier, the semiconductor rectifiers pertaining to said first and second switching means being connected to have the same polarity with respect to a load connected to the system and the semiconductor rectifiers pertaining to said third and fourth switching means being connected to have the same polarity with respect to a load connected to the system; there being a direct connection, free of rectifier-equipped switching means, interconnecting line 1 of said first set and line 1 of said second set.

8. The combination defined in claim 7 wherein each of said switching means includes an additional switch which completely interrupts the electrical connection in which the respective switch means is incorporated.

References Cited by the Examiner
UNITED STATES PATENTS

| | | | |
|---|---|---|---|
| 2,361,155 | 10/1944 | Stevens et al. | 321—48.4 X |
| 2,419,431 | 4/1947 | Williams | 318—212 X |
| 2,733,393 | 1/1956 | Carlise | 318—212 X |
| 3,058,252 | 10/1962 | Matusche | 307—107 X |

ORIS L. RADER, *Primary Examiner.*

LLOYD McCOLLUM, *Examiner.*

W. SHOOP, T. J. MADDEN, *Assistant Examiners.*